Nov. 6, 1923.
M. E. CLARK
GUIDE
Filed March 11, 1922
1,473,465
3 Sheets-Sheet 1
Fig. 1.
Fig. 2.
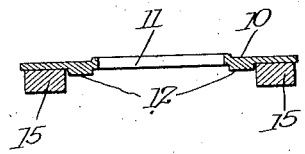
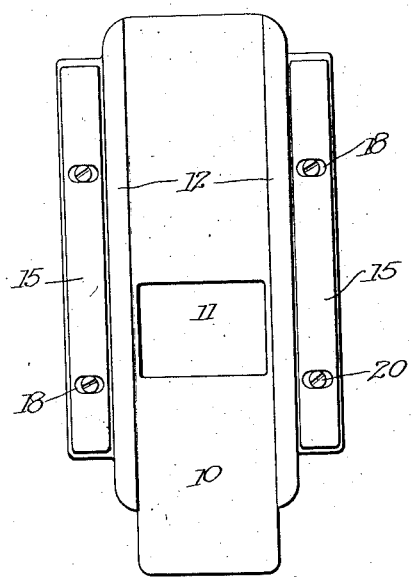
Fig. 3.
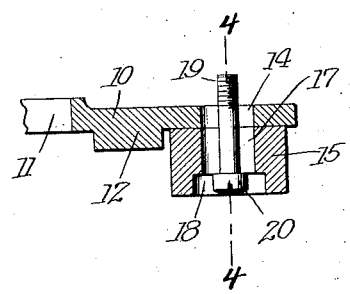
Fig. 4.
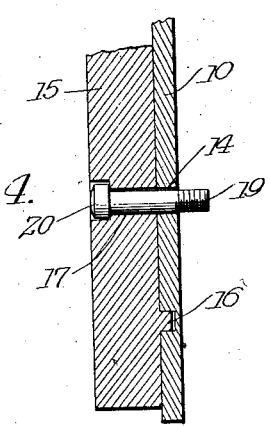
M. E. Clark
INVENTOR
BY Victor J. Evans
ATTORNEY
WITNESS:

Nov. 6, 1923.

M. E. CLARK

GUIDE

Filed March 11, 1922

M. E. Clark.
INVENTOR

BY Victor J. Evans
ATTORNEY

WITNESS:

Nov. 6, 1923.

M. E. CLARK

GUIDE

Filed March 11, 1922 — 3 Sheets-Sheet 3

1,473,465

Inventor
M. E. Clark.

By Victor J. Evans
Attorney

Patented Nov. 6, 1923.

1,473,465

UNITED STATES PATENT OFFICE.

MAURICE E. CLARK, OF GRENADA, MISSISSIPPI.

GUIDE.

Application filed March 11, 1922. Serial No. 543,004.

*To all whom it may concern:*

Be it known that I, MAURICE E. CLARK, a citizen of the United States, residing at Grenada, in the county of Grenada and State of Mississippi, have invented new and useful Improvements in Guides, of which the following is a specification.

My present invention has reference to a tracker or film guiding plate for motion picture cameras and motion picture projector machines and motion picture printing machines.

My object is to produce a tracker plate by which the film will be positively guided in its passage thereover without danger or liability of side motion.

A further object is to produce a tracker plate having a view aperture and raised tracks to the sides of the aperture, while outward of but in a line with the tracks are guides which are laterally adjustable with respect to each other but which are positively held adjusted.

A still further object is to produce a tracker plate or guide plate for picture films having a view aperture, tracks to the opposite sides of the aperture and laterally extending grooves or depressions outward of the tracks, said grooves or depressions receiving therein lugs on the inner face of guide members, means securing the guide members to the plate in a manner to permit of the adjusting of said guides with respect to each other, and the lugs on the under face of the guide members being equi-distantly spaced whereby should wear occur on the inner or active edge of the guides the same, upon the removal of the securing means, may be reversely positioned on the plate.

A further object is to produce a tracker plate having a view aperture, tracks on the opposite sides of the aperture, lugs outward of the tracks, and guide members having laterally extending grooves or depressions which receive the lugs, means being provided for securing the guide members to the plate in a manner to permit of the adjustment of said guides with respect to each other, and wherein the construction is such that should wear occur upon the inner or active edges of the guides the same, upon removal of the securing means may be reversely positioned on the plate.

The foregoing objects may be accomplished by a construction, combination and operative arrangement of parts such as is disclosed by the drawings which accompany and which form part of this specification.

In the drawings:—

Figure 1 is a perspective view of a film guide or tracker plate in accordance with this invention.

Figure 2 is an approximately central transverse sectional view through the same.

Figure 3 is a detail transverse sectional view in a line with the securing means for one of the guides, on an enlarged scale.

Figure 4 is a sectional view approximately on the line 4—4 of Figure 3.

Figure 5:
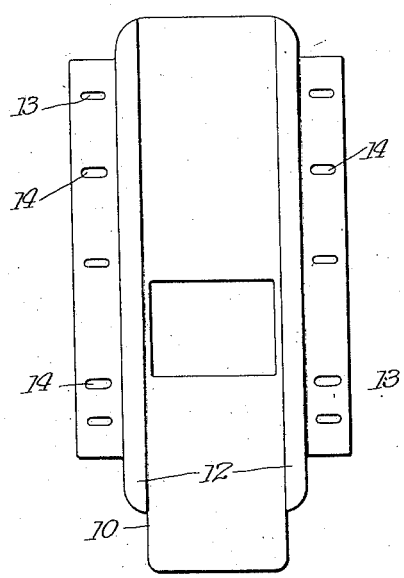
Figure 5 is a plan view of the tracker plate.
Figure 6:
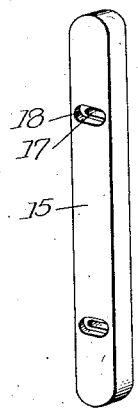
Figure 6 is a perspective view of one of the guides.
Figure 7:
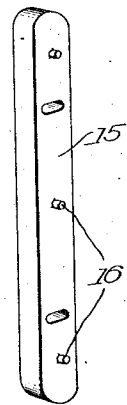
Figure 7 is a view substantially similar to Figure 3, but illustrating a modification.

The film guide or tracker plate is, in the drawings, broadly indicated by the numeral 10. The plate is provided with a view aperture 11, and the said plate, to the sides of the aperture is provided with raised parallel portions 12 that provide the tracks over which the film travels. The plate, to the opposite and outer sides of the track 12 have equi-distantly spaced laterally extending somewhat elongated grooves 13 and also with a series of openings 14.

On the plate and over the grooves and openings 13 and 14 I arrange substantially rectangular plates that provide guides 15. Each guide 15 has its inner face formed with lugs 16, the said lugs being equi-distantly spaced and being received in the equi-distantly spaced grooves 13. The guide members 15, at points opposite the openings 14 have laterally arranged elongated openings 17 therethrough, and the outer faces of the said guide members are reamed or formed with depressions 18 that surround the openings 17. Through the openings 17 there are passed the shanks of screws 19, the heads 20 of the said screws being received in the reamed or depressed portions 18. The screws pass through the openings 14. In some instances, the openings 14 are threaded and are engaged by the threads of the screws 19, while in other instances the screws pass through the openings and are connected directly to the frame on which the tracker plate is supported.

Again, in some instances, the guide members 15 are fastened directly on to the plate 10, independent of the frame supporting plate, the screws 19, the heads 20 of the said screws being received in the reamed or depressed portions 18.

With my tracker plate, it will be noted that the film tracks are elevated above the plate proper, and that the guide members may be adjusted toward or away from each other so as to slightly contact the edges of films of varying widths. Preferably the guide members do not contact with the outer sides of the tracks. By providing a space between the guides and tracks even wear by the film is imparted to the latter. Should wear occur upon the active edges of either of the guides the screws may be removed and the guides reversed by being turned end for end, the lugs on the said guides, as previously stated, are equi-distantly spaced and will therefore be properly received in the equi-distantly spaced grooves 13. When so arranged the openings 14 in the plate will also properly align with the screw openings in the guides.

It will be further noted that in addition to turning the guides end for end, they can be transferred from one side of the plate to the other when wear occurs on the active side of the plate.

Figure 8:
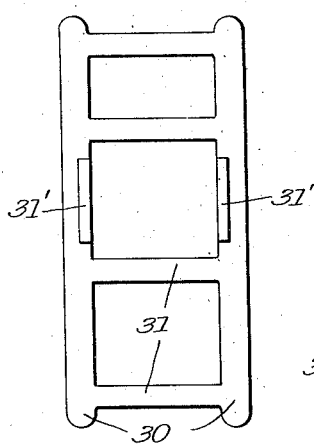
Figure 8 is a plan view of the tension shoe which may be employed.
Figure 9:
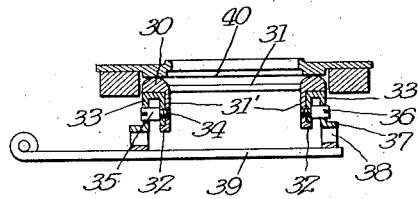
Figure 9 is a sectional view through the improvement illustrating the tension shoe applied thereon.
Figure 10:
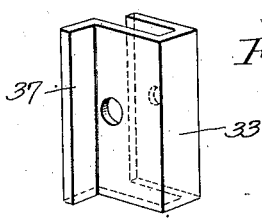
Figure 10 is a perspective view of one of the angular head members.

Because of the obsolete type of tension shoes on motion picture machinery I have found it necessary to employ a tension shoe such as is illustrated in Figure 8 and the remaining figures of the drawings. The tension shoe comprises spaced parallel members which are designed, as illustrated in Figure 8 of the drawings to be arranged in direct contact with the film when the latter is received on the tracker plate. The shoes are indicated by the numeral 30, and are held in spaced relation to each other by suitable connecting elements 31. Each shoe 30 has at its center an upstanding flange 31' provided with an angular head 32. Each of the flanges 31' has an opening therethrough, and received against the flanges and below the heads are substantially U-shaped members in the nature of elbows 33. One of the arms of each of the elbows 33 has a comparatively large opening therethrough, the second arm having a restricted threaded opening therethrough. This last mentioned opening is engaged by the threaded end 34 of a screw member 35. The body of the screw is non-threaded, but has its end kerfed, as at 36 so that the threaded end 34 thereof may be screwed in the referred to threaded opening in the elbow. Each elbow has a flange 37 which has either secured thereon or formed therewith a spring 38. As disclosed in Figure 9 of the drawings, these springs exert a tension between the elbows and the gates 39 of the moving picture machine, and consequently force the shoes 30 against the film 40.

Figure 11:
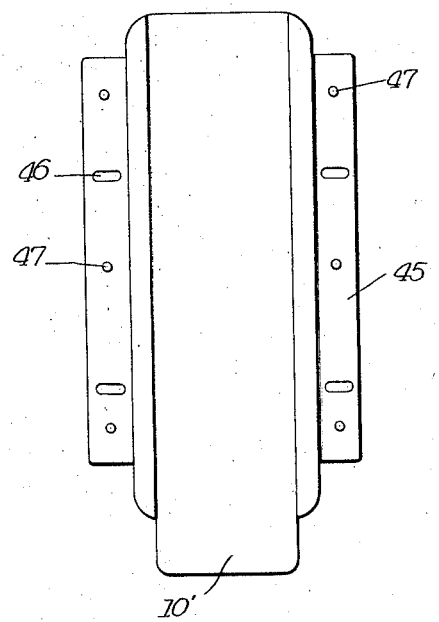
Figure 11 is a plan view of the tracker plate, illustrating a slight modification.
Figure 12:
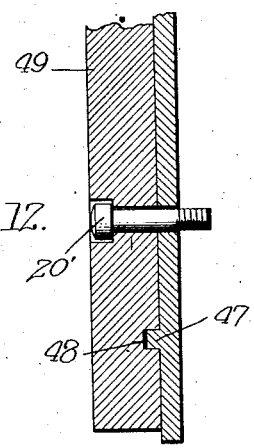
Figure 12 is a sectional view, approximately similar to Figure 4, but illustrating a slight modification.
Figure 13:
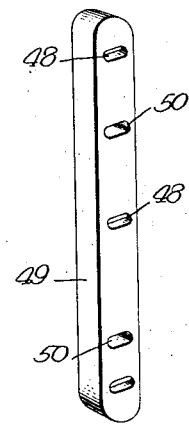
Figure 13 is a perspective view of one of the guides, illustrating a further modification.

In Figure 11, the tracker plate 10' is substantially similar to that previously described, the same having its outer flanges 45 provided with slots 46 and with studs 47. As disclosed in Figure 12 of the drawings, the studs are designed to be received in depressions 48 in the guide members 49. In addition to the transversely arranged elongated depressions 48 the guide members 49 are provided with similar transversely arranged elongated openings 50 therethrough which register with the slots 46 in the tracker plate, and through these openings the bolt members 20' pass.

Having described the invention, I claim:—

1. In a device for the purpose set forth, a tracker plate having a view opening, elevated tracks to the opposite sides of the opening, and reversible and laterally adjustable guide members on the plate to the outer sides of the tracks.

2. In a device for the purpose set forth, a tracker plate provided with a view opening and having elevated tracks to the opposite sides of the opening, said plate having equi-distantly spaced laterally arranged somewhat elongated grooves to the outer side of the tracks, guide members having lugs received in the grooves, means securing the guide members to the plate, and said means permitting the adjustment of the guide members with respect to each other.

In testimony whereof I affix my signature.

MAURICE E. CLARK.